(12) United States Patent
Rao et al.

(10) Patent No.: US 12,476,780 B2
(45) Date of Patent: Nov. 18, 2025

(54) PASSIVE PHASE INTERPOLATOR

(71) Applicant: Analog Devices International Unlimited Company, Limerick (IE)

(72) Inventors: Narendra M.K. Rao, Alamo, CA (US); Rajasekhar Nagulapalli, Northampton (GB)

(73) Assignee: Analog Devices International Unlimited Company, Limerick (IE)

( * ) Notice: Subject to any disclaimer, the term of this patent is extended or adjusted under 35 U.S.C. 154(b) by 5 days.

(21) Appl. No.: 18/141,189

(22) Filed: Apr. 28, 2023

(65) Prior Publication Data

US 2024/0364493 A1    Oct. 31, 2024

(51) Int. Cl.
*H04L 7/00* (2006.01)
*H04L 7/033* (2006.01)

(52) U.S. Cl.
CPC .......... *H04L 7/0025* (2013.01); *H04L 7/0087* (2013.01); *H04L 7/0337* (2013.01)

(58) Field of Classification Search
CPC ...................................................... H04L 7/0025
USPC ......................................................... 375/371
See application file for complete search history.

(56) References Cited

U.S. PATENT DOCUMENTS

| | | | | |
|---|---|---|---|---|
| 2009/0096494 A1* | 4/2009 | Gschier | ................. | H03K 3/289 327/115 |
| 2011/0068827 A1* | 3/2011 | Ali | ......... | H03D 13/00 327/3 |
| 2011/0260902 A1* | 10/2011 | Lee | ....... | G04F 10/005 341/166 |
| 2022/0201844 A1* | 6/2022 | Scogna | ............... | H01P 1/20381 |

FOREIGN PATENT DOCUMENTS

CN    118868879 A    10/2024
DE    102024101080 A1    10/2024

* cited by examiner

*Primary Examiner* — Lihong Yu
(74) *Attorney, Agent, or Firm* — Schwegman Lundberg & Woessner, P.A.

(57) ABSTRACT

A phase interpolator for generating a phase interpolated output signal between two phase separated input signals received at two phase separated input signal nodes may include a plurality of circuit elements. The plurality of circuit elements may include at least one of resistors or capacitors, in a series arrangement between the two phase separated input signal nodes, where respective connection points between respective ones of the plurality of circuit elements may provide at least one intermediate phase interpolated signal. The phase interpolator may also include selection circuitry, which may be configured to select the phase interpolated output signal from the at least one intermediate phase interpolated signal.

19 Claims, 6 Drawing Sheets

PASSIVE PHASE INTERPOLATOR

TECHNOLOGICAL FIELD

The present disclosure relates to electronics, and more particularly, but not by way of limitation, to a phase interpolator that can be constructed at least partially with passive components.

BACKGROUND

Electronic systems can use a phase interpolator to derive a signal with a new phase. For example, it may be beneficial for a system to generate a clock signal that is phase delayed from another clock signal. This phase delayed signal may be desired for one or more processes in a signal analysis circuit or integrated circuit. Phase interpolation may also be desired to obtain an intermediate phase between two phase separated signals.

SUMMARY

In an approach, a phase interpolator may be constructed using one or more current sources, such as may include one or more current mirrors. The current sources and current mirrors may need to be constructed and tuned with a specified level of precision. For example, the current sources and current mirrors may need to be stable over a range of process, voltage, and temperature (PVT) variation. This may result in a phase interpolator that is one or more of expensive to manufacture, inaccurate, unstable, or large in size.

The present inventors have recognized, among other things, that it may be desirable to construct a phase interpolator circuit at least in part using passive elements, such as may include capacitors and resistors. The passive circuit elements may be one or more of easier to manufacture, smaller in size, or more accurate than some approaches to phase interpolation. For example, the phase shift of the phase interpolator may be determined by selecting component values such as capacitance and resistance. The use of passive components may also help to alleviate the need for matching between active components, tuning of active components, or both. This document describes, among other things, a phase interpolator that can be constructed at least in part using passive components.

In an example a phase interpolator for generating a phase interpolated output signal between two phase separated input signals received at two phase separated input signal nodes may include a plurality of circuit elements. The plurality of circuit elements may include at least one of resistors or capacitors, in a series arrangement between the two phase separated input signal nodes, where respective connection points between respective ones of the plurality of circuit elements may provide at least one intermediate phase interpolated signal. The phase interpolator may also include selection circuitry, which may be configured to select the phase interpolated output signal from the at least one intermediate phase interpolated signal.

In an example, a system for generating a phase shifted output signal from at least three input signals may include signal selection circuitry, which may be configured to select a first intermediate signal and a second intermediate signal from the at least three input signals, where the first intermediate signal is phase shifted from the second intermediate signal. The system may also include a plurality of resistors, which may be in a series arrangement between a first intermediate signal node carrying the first intermediate signal and a second intermediate signal node carrying the second intermediate signal; where respective connection points between respective ones of the plurality of resistors form output nodes. The system may also include multiplexor circuitry, which may be configured to select the phase shifted output signal from a specified one of the output nodes.

In an example, a method of interpolating a phase between two phase separated input signals may include providing the two phase separated input signals to opposite ends of a plurality of resistors in a series arrangement, where respective connection points between respective ones of the plurality of resistors may define phase interpolated nodes. The method may also include selecting a phase interpolated node.

BRIEF DESCRIPTION OF THE DRAWINGS

In the drawings, which may not be drawn to scale, like numerals may describe substantially similar components throughout one or more of the views. Like numerals having different letter suffixes may represent different instances of substantially similar components. The drawings illustrate generally, by way of example but not by way of limitation.

DETAILED DESCRIPTION

A signal that is periodic or otherwise recurrent may have a phase value. A time to complete an entire cycle of the signal may be called the period. The entire period may be assigned a phase value equivalent to one period, for example, 360 degrees. A signal of the same waveform that is phase shifted in time may be labelled with a phase shift value. For example, a signal that is one quarter of a period ahead may be assigned a phase of 90 degrees, and a signal that is one quarter of a period behind may be assigned of phase of negative 90 degrees. A phase shifted sinusoidal signal may be represented by equation 1.

$$\text{Sinuisoidal Signal} = \sin(\omega t + \theta) \qquad \text{Equation 1}$$

In equation 1, $\omega$ is the frequency of the sinusoid, t is time, and $\theta$ is the phase shift.

A signal may be represented as a weighted sum of in-phase and quadrature-phase components, where the quadrature-phase components is shifted by 90 degrees from the in-phase component. For example, a sinusoidal signal may be represented by equation 2.

$$\text{Sinusoidal Signal} = I*\cos(\omega t) + Q*\sin(\omega t) \qquad \text{Equation 2}$$

In equation 2, I is the in-phase weight and Q is the quadrature-phase weight. The sine function may be 90 degrees behind the cosine function, which may provide the 90 degree phase shift for the quadrature-phase weight.

Equation 1 may be expanded to show an equivalent representation of a phase shifted sinusoidal signal in terms of in-phase and quadrature-phase components as shown in equations 3-4.

$$\sin(\omega t + \theta) = \sin(\omega t)\cos(\theta) + \cos(\omega t)\sin(\theta) \qquad \text{Equation 3}$$

$$\sin(\omega t + \theta) = I*\cos(\omega t) + Q*\sin(\omega t) \qquad \text{Equation 4}$$

In equation 4, I=sin(θ) and Q=cos(θ). Therefore, equation 4 shows how a phase shifted sinusoid may be constructed with a weighted sum of in-phase and quadrature-phase components. Equations 5 and 6 show the relationship between I, Q, and θ.

$$\frac{\sin(\theta)}{\cos(\theta)} = \frac{I}{Q} = \tan(\theta) \qquad \text{Equation 5}$$

$$\theta = \arctan\left(\frac{I}{Q}\right) \qquad \text{Equation 6}$$

From equations 1-6, the in-phase and quadrature-phase weights for a given value of θ can be determined.

Figure 1:
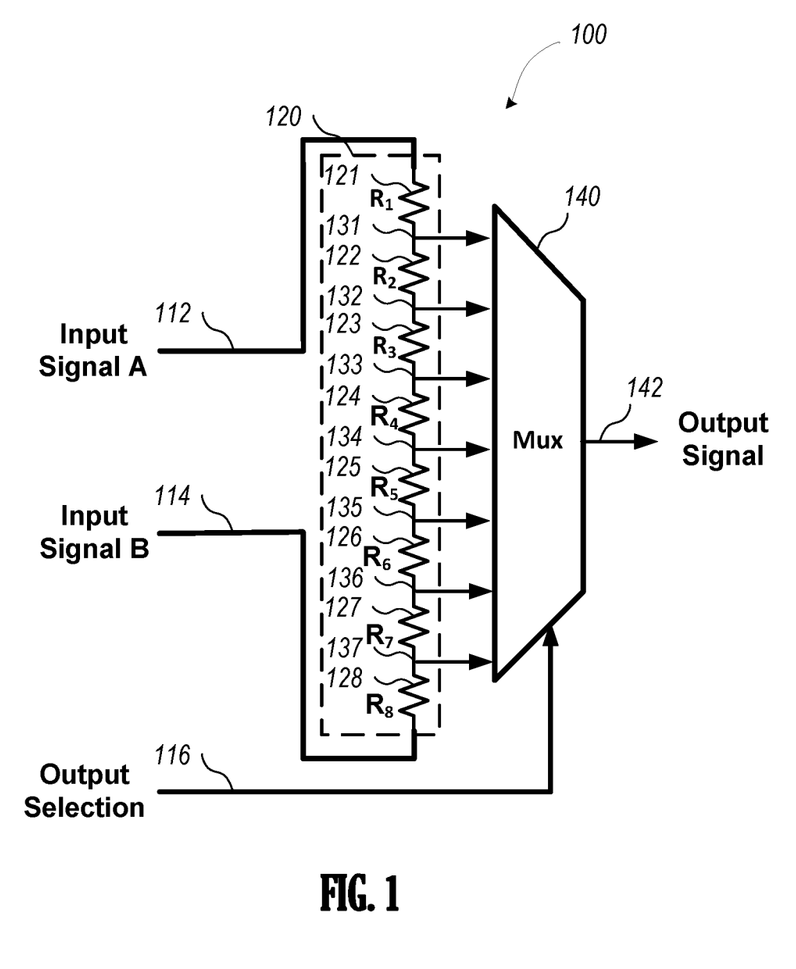
FIG. 1 is a schematic drawing of an example of portions of a phase interpolator circuit.

FIG. 1 is a schematic drawing of an example of portions of a phase interpolator circuit 100. FIG. 1 shows that the phase interpolator circuit 100 may include a first input signal node 112, a second input signal node 114, an output selection signal node 116, and an output signal node 142. The phase interpolator circuit 100 may include a plurality of circuit elements 120. The phase interpolator circuit 100 may also include selection circuitry 140.

The first input signal node 112 and the second input signal node 114 may receive phase separated signals. For example, the second input signal node 114 may receive a second input signal having the same waveform as a first input signal received on the first input signal node 112, but the second input signal may be shifted forward or backward in time. In an example, the signals received by the first input signal node 112 and the second input signal node 114 may be required to be phase separated for the phase interpolator circuit 100 to generate an interpolated signal. For example, if the signals received on the first input signal node 112 and the second input signal node 114 are not phase separated, the phase interpolator circuit 100 may generate an output signal on the output signal node 142 that has a phase equal to the first input signal node 112 and the second input signal node 114. In an example, the phase interpolator circuit 100 may receive a first input signal on the first input signal node 112 and use phase shift circuitry to generate a phase shifted signal on the second input signal node 114. This may help to allow the phase interpolator circuit 100 to generate a phase interpolated output signal without phase separated input signals.

The plurality of circuit elements 120 may include one or more resistors, such as may include a resistor one 121, a resistor two 122, a resistor three 123, a resistor four 124, a resistor five 125, a resistor six 126, a resistor seven 127, and a resistor eight 128. The resistors 121-128 may be connected in a series arrangement to form the plurality of circuit elements 120. One end of the plurality of circuit elements 120 may be connected to the first input signal node 112, and the other end of the plurality of circuit elements 120 may be connected to the second input signal node 114. In an example, the plurality of circuit elements 120 may include one or more other types of circuit elements, such as may include capacitors, or inductors, or both.

The respective connection points between the resistors 121-128 may form intermediate phase interpolated nodes. For example, the phase interpolated node one 131 may be formed at the connection point of resistor one 121 and resistor two 122. The plurality of circuit elements 120 may also include a phase interpolated node two 132, a phase interpolated node three 133, a phase interpolated node four 134, a phase interpolated node five 135, a phase interpolated node six 136, and a phase interpolated node seven 137.

In an example, the plurality of circuit elements 120 may include one or more circuit elements in parallel. For example, one or more of the resistors 121-128 may represent an equivalent resistance value of two or more resistors in parallel. In an example, one or more of the resistors 121-128 may represent an equivalent resistance value of two or more resistors in series. In an example, one or more of the resistors 121-128 may represent an equivalent resistance value of two or more resistors in one or more of a series or parallel combination. In an example, one or more of the resistors 121-128 may represent an equivalent resistance of a circuit, such as may include a switched capacitor circuit.

The selection circuitry 140 may be configured to select one of the phase interpolated nodes 131-137 for connection to the output signal node 142. The selection circuitry 140 may include a multiplexor. The selection circuitry 140 may receive a signal on the output selection signal node 116, such as may include a binary signal. The selection circuitry 140 may output the phase interpolated node indicated by the signal on the output selection signal node 116. In an example, the output selection signal node 116 may carry a signal indicating more than one phase interpolated node for output, and the selection circuitry 140 may be configured to output more than one phase interpolated signal. For example, the selection circuitry 140 may include two or more multiplexors. The inputs of each multiplexor may be coupled in parallel to the phase interpolated nodes 131-137. The output selection signal carried on the output selection signal node 116 may be a binary signal with a portion of the binary signal corresponding to a first multiplexor and a portion of the binary signal corresponding to a second multiplexor. In an example, the selection circuitry 140 may be able to select three or more phase interpolated signals for output.

The component values of the plurality of circuit elements 120 may determine a relative phase shift of the phase interpolated nodes 131-137. The resistors 121-128 may act as a voltage divider between the signal on the first input signal node 112 and the signal on the second input signal node 114. The voltage at a specified phase interpolated node may be a weighted sum of the voltage on the first input signal node 112 and the voltage on the second input signal node 114, where a weight of each voltage is determined by the values of the resistors 121-128. For example, the voltage at node one 131 may be calculated according to equation 7.

$$V_{131} = \frac{V_{112}*(R_2 + R_3 + \ldots + R_7 + R_8) + V_{114}*(R_1)}{(R_1 + R_2 + \ldots + R_7 + R_8)} \qquad \text{Equation 7}$$

In equation 7, $V_{131}$ is the voltage on phase interpolated node one 131, $V_{112}$ is the voltage on the first input signal node 112, and $V_{114}$ is the voltage on the second input signal node 114. When a phase of the signal on the first input signal node 112 is different from a phase of the signal on the second input signal node 114, the voltage dividing effect of the plurality of circuit elements 120 may act as a phase interpolator.

A linear phase separation between respective ones of the phase separated nodes 131-137 may be desired. For example, it may be desirable to have an equal phase spacing between adjacent connection points. This may result in there being an equal phase spacing between phase interpolated node one 131 and phase interpolated node two 132 as there is between phase interpolated node two 132 and phase interpolated node three 133. In an example, the signal on the first input signal node 112 may be a sine wave, and the signal on the second input signal node 114 may be a cosine wave. The signal on the second input signal node 114 may lead the signal on the first input signal node 112 by 90 degrees. This may result in a desired phase shift of 11.25 degrees between respective ones of the phase separated nodes 131-137. The phase separation of 90 degrees between the signal on the first input signal node 112 and the signal on the second input signal node 114 may allow for the use of the trigonometric formulas in equations 1 through 6 for determining the weighted sums of in-phase and quadrature-phase components to achieve the desired phase shift. For example, the weight of the signal on the first input signal node 112 and the weight of the signal on the second input signal node 114 may be calculated as shown in Table 1.

TABLE 1

| Phase Interpolated Node | Desired Phase shift with respect to node 112 – θ (degrees) | Weight of Signal B – I = sin (θ) | Weight of Signal A – Q = cos (θ) |
|---|---|---|---|
| 131 | 11.25 | 0.195 | 0.981 |
| 132 | 22.5 | 0.383 | 0.924 |
| 133 | 33.75 | 0.556 | 0.831 |
| 134 | 45 | 0.707 | 0.707 |
| 135 | 56.25 | 0.831 | 0.556 |
| 136 | 67.5 | 0.924 | 0.383 |
| 137 | 78.75 | 0.981 | 0.195 |

It may be desirable to normalize the weights so that the sum of the weights for a given phase interpolated node is equal to a constant, such as may include one. This may allow for one or more of the generation of the phase interpolated signals with only passive elements in the plurality of circuit elements 120, or the generation of multiple phase interpolated values with a the plurality of circuit elements 120. Table 2 shows the normalization of weights and the calculation of values for resistors 121-128.

TABLE 2

| Phase interpolated Node | Normalization Factor: 1/(I + Q) | Normalized I | Normalized Q |
|---|---|---|---|
| 131 | 0.850 | 0.166 | 0.834 |
| 132 | 0.765 | 0.293 | 0.707 |
| 133 | 0.721 | 0.401 | 0.599 |
| 134 | 0.707 | 0.500 | 0.500 |
| 135 | 0.721 | 0.599 | 0.401 |
| 136 | 0.765 | 0.707 | 0.293 |
| 137 | 0.850 | 0.834 | 0.166 |

From the normalized weights shown in Table 2, the component values of the plurality of circuit elements 120 may be calculated. A total desired series resistance may be selected, such as 100 kiloohms. The total series resistance may be selected to one or more of minimize energy dissipation in the resistors, minimize circuit area, or increase accuracy when there is a current in the output signal node 142. From the total desired series resistance, a total resistance between each of the respective phase interpolated nodes 131-137 and the first input signal node 112 may be calculated to obtain the normalized weighting values. From the total resistance values, a differential total resistance between each of the phase interpolated nodes 131-137 may be calculated as the resistance value. Table 3 shows an example.

TABLE 3

| Resistor | Totalized Value of All Resistors Between Bottom of Resistor and Node 112 (ohms) | Value of Resistor (ohms) |
|---|---|---|
| 121 | 16591 | 16591 |
| 122 | 29289 | 12698 |
| 123 | 40054 | 10765 |
| 124 | 50000 | 9946 |
| 125 | 59946 | 9946 |
| 126 | 70711 | 10765 |
| 127 | 83409 | 12698 |
| 128 | 100000 | 16591 |

Table 3 shows that the resistance values may differ between respective resistors. For example, it may be necessary to use differing resistor values to achieve a uniform phase spacing between respective ones of the phase interpolated nodes 131-137.

In an example, a non-linear phase spacing may be desired. For example, one or more of a logarithmic, sinusoidal, exponential, quadratic, or a phase spacing following any other function may be desired. Resistor values may be selected to provide a specified phase spacing.

Figure 2:
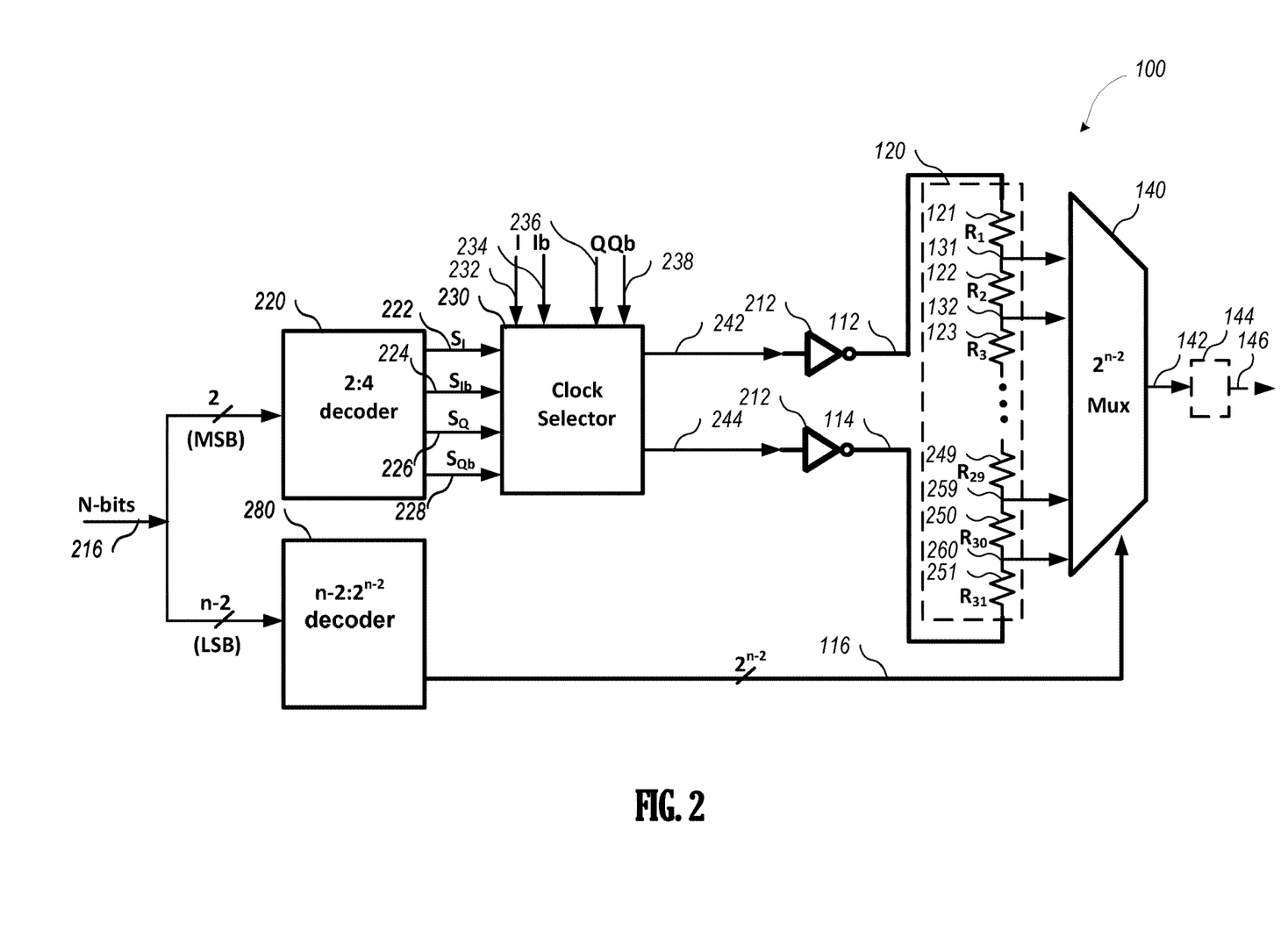
FIG. 2 is a schematic drawing of an example of portions of a phase interpolator circuit and portions of an example of a system in which the phase interpolator circuit can be used.

FIG. 2 is a schematic drawing of an example of portions of a phase interpolator circuit 100 and portions of an example of a system in which the phase interpolator circuit 100 can be used. FIG. 2 shows that the phase interpolator circuit may include a phase selection signal node 216, a clock selector 230, a plurality of circuit elements 120, selection circuitry 140, and an output signal node 142.

The plurality of circuit elements 120 and the selection circuitry 140 may be configured similarly to the example of FIG. 1, or the configuration may differ in one or more ways. FIG. 2 shows that the plurality of circuit elements 120 may include 31 resistors, including a resistor 29 249, a resistor 30 250, and a resistor 31 251. The plurality of circuit elements 120 may also include 30 interpolated nodes including phase interpolated node 29 259 and phase interpolated node 30 260. The selection circuitry 140 may include 30 inputs coupled to the 30 phase interpolated nodes, and an output signal node 142. The resistance values of the plurality of circuit elements 120 may be determined similarly to the resistance values for FIG. 1. The phase spacing adjacent ones of the phase interpolated nodes may be evenly spaced or spaced by a specified phase spacing, such as may include one or more of logarithmic, exponential, etc.

The phase selection signal node 216 may receive a multi-bit digital signal that may determine the output phase of the signal on the output signal node 142. FIG. 2 shows that the two most significant bits may form a "coarse" selection, such as may determine the phase of the signals input to the plurality of circuit elements 120. The remaining bits (i.e., the bits in the multi-bit control signal less the two most significant bits) may form a "fine" selection that forms the signal on the output selection signal node 116 and controls the selection circuitry 140 to select a specific one of the interpolated nodes. For example, the second decoder 280 may remove the two most significant bits from the signal received on the phase selection signal node 216 and pass the signal to the output phase selection signal node 116. The signal input on the phase selection signal node 216, through the "coarse" and "fine" selection, may be able to select an input spanning the full range of the phase interpolator circuit 100. In an example, the "coarse" selection may include more of less than two bits, such as may include one bit, two bits, three bits, four bits, or five bits. In an example, the number of bits received on the phase selection signal node 216 may include six bits, eight bits, 10 bits, 12 bits, or 14 bits.

The first decoder 220 may receive the two most significant bits received on the phase selection signal node 216 and generate four control signals on respective ones of the first control node 222, a second control node 224, a third control node 226, and a fourth control node 228. The first decoder 220 may demultiplex the two most significant bits into a four-bit signal where only a single output is high at one time.

The clock selector 230 may accept as inputs four control signals on respective ones of the first control node 222, the second control node 224, the third control node 226, and the fourth control node 228. The clock selector 230 may also accept as inputs four signals on respective ones of a first signal node 232, a second signal node 234, a third signal node 236, and a fourth signal node 238. One or more of the signals on nodes 232-238 may be phase separated from one or more of the other signals. In an example, each of the signals may have a different phase. In an example, the signals received on the nodes 232-238 may be sinusoidal signals separated by 90 degrees. The signals received by nodes 232-238 may be generated by a an IQ-generator that receives a clock signal, such as may include a square wave signal, and generates four sinusoidal outputs each phase separated by 90 degrees (i.e., the first signal has a phase of zero degrees, the second signal has a relative phase of 90 degrees, the third signal has a relative phase of 180 degrees, and the fourth signal has a relative phase of 270 degrees).

The clock selector 230 may output one of the input signals to a first output node 242 and another one of the output signals to a second output node 244. The signals output may depend upon the status of the four control signals. In an example, the clock selector 230 may output pairs of signals that are separated by 90 degrees, with the leading signal on the second output node 244. Table 3 shows an example of the clock selector 230 functioning.

TABLE 3

| Control Node with High Signal | Phase on Node 242 (degrees) | Phase on Node 244 (degrees) |
| --- | --- | --- |
| 222 | 0 | 90 |
| 224 | 90 | 180 |
| 226 | 180 | 270 |
| 228 | 270 | 0 |

Table three shows that one of the control nodes 222-228 may receive a high signal at one time, and the remaining of the control nodes 222-228 may receive a low signal. The control node 222-228 with the high signal may determine which of the signals received on the signal nodes 232-238 are output to the first output node 242 and second output node 244. A 0 degree phase may be equivalent to a 360 degree phase. Therefore, a signal with a 0 degree phase (e.g., a 360 degree phase signal) may lead a signal with a 270 degree phase by 90 degrees.

The signal on the first output node 242 may pass through an inverting buffer 212 before it reaches the first input signal node 112. The inverting buffer 212 may be configured to one or more of increase an available signal voltage, increase an available signal current, or maintain the waveform of the signal. The inverting buffer 212 may also invert the signal on the first output node 242 before it is passed to the first input signal node 112. In an example, the phase interpolator circuit 100 or another circuit may account for the inversion generated by the inverting buffer 212. For example, an inversion may result in a 180 degree phase shift, and this may be accounted for in the circuit design or output selection.

The signal on the second output node 244 may pass through an inverting buffer 212 before it reaches the second input signal node 114. The inverting buffer 212 connected between the second output node 244 and the second input signal node 114 may be configured similarly to the inverting buffer 212 connected between the first output node 242 and the first input signal node 112, or the configuration may differ in one or more ways.

One or more optional output circuits 144 may be connected to the output signal node 142. The output circuit 144 may receive the signal on the output signal node 142 as an input and generate an adjusted output 146. In an example, the one or more optional output circuits 144 may be configured to convert a sine wave received on the output signal node 142, to a clock signal, such as may include a square clock wave. For example, the output circuit 144 may convert a sinusoidal or other input signal into an output signal with at least one of a defined rising edge or a defined falling edge. The amplitude of the clock signal output to the adjusted output 146 may not be dependent upon the amplitude of the signal received on the output signal node 142. The output circuit 144 may use a complimentary transistor inverter to generate the clock signal.

In an example, the one or more optional output circuits 144 may be a signal amplifier, such as may include an adjustable signal amplifier. The signal amplifier may amplify the signal received on the output signal node 142 while maintaining a shape of the waveform. The signal amplifier may help to correct a difference in amplitude between different selected output phases, such as may be due at least in part to the normalization factor in determining I and Q values. For example, a smaller normalization factor may result in a signal that has a smaller amplitude. The signal amplifier may amplify the signal received on the output signal node 142 towards at least one of a voltage or current level of the signal received on one or more of the first input signal node 112 or the second input signal node 114.

In an example, the phase interpolator circuit 100 may be configured to output one of the outputs received on nodes 232-238 (i.e., output the received signal without phase shift). For example, the phase interpolator circuit 100 may directly connect the received signal to the output signal node 142. In an example, the selection circuitry 140 may include one or more additional inputs connected to one or more of the first input signal node 112 or the second input signal node 114, which may allow the selection circuitry 140 to output one of the input signals without interpolation. In an example, the phase interpolator circuit 100 of FIG. 2 may operate at a frequency that is between 12 gigahertz and 16 gigahertz inclusive. In an example, the phase interpolator circuit 100 of FIG. 2 may operate at a frequency that is above 16 gigahertz.

Figure 3:
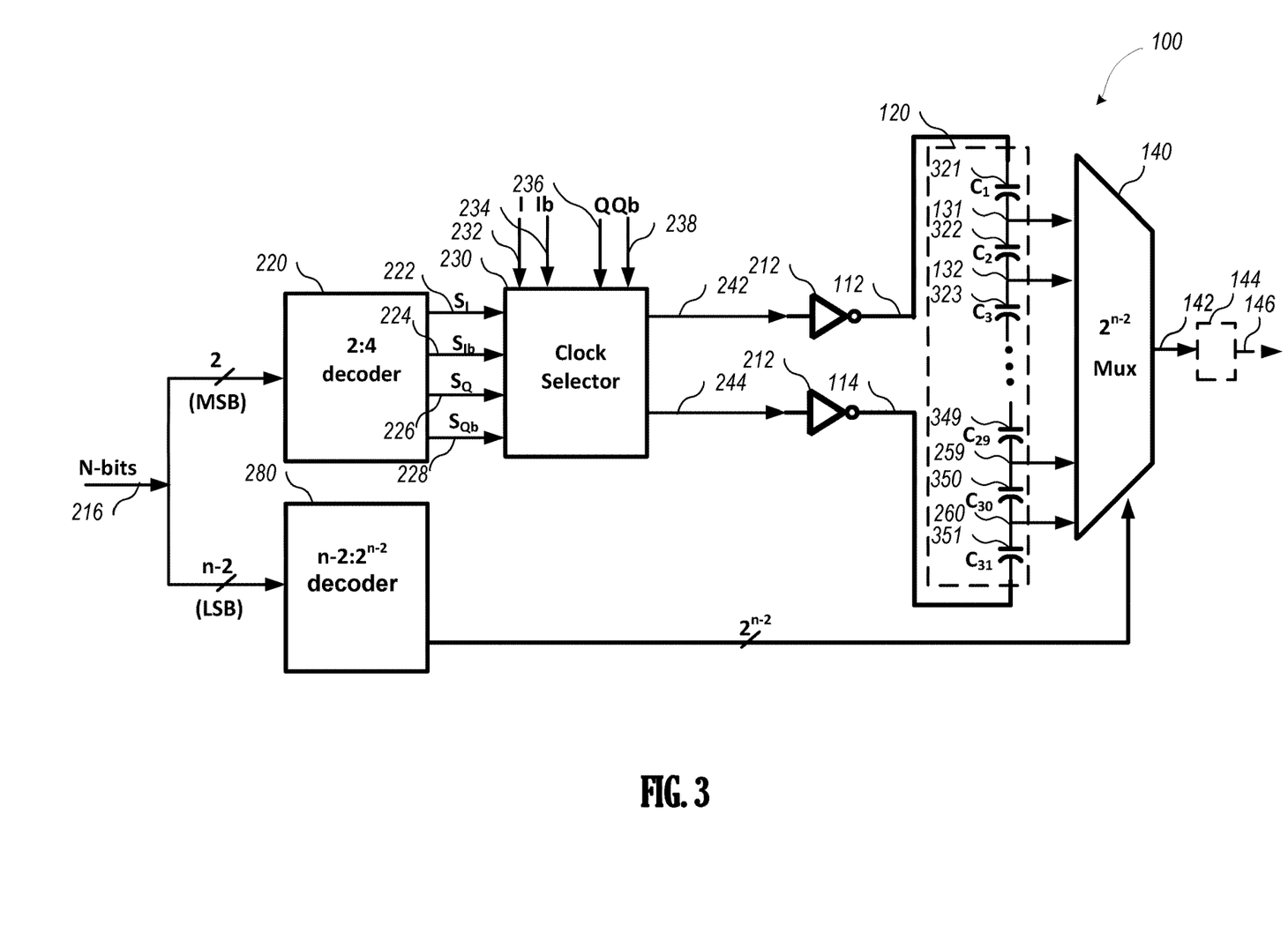
FIG. 3 is a schematic drawing of an example of portions of a phase interpolator circuit and portions of an example of a system in which the phase interpolator circuit can be used.

FIG. 3 is a schematic drawing of an example of portions of a phase interpolator circuit 100 and portions of an example of a system in which the phase interpolator circuit can be used. The phase interpolator circuit 100 shown in FIG. 3 may be configured similarly to the phase interpolator circuit 100 of FIG. 2 except that the plurality of circuit elements 120 may include a series arrangement of 31 capacitors (i.e., capacitor one 321, capacitor two 322, capacitor three 323 . . . capacitor 29 349, capacitor 30 350, and capacitor 31 351).

The capacitance values of the capacitors included in the plurality of circuit elements 120 may be determined similarly to the resistance values of FIG. 1. For example, the plurality of circuit elements 120 may be considered a voltage divider, and equation for a capacitor voltage divider may be substituted for the equation of a resistor voltage divider. In an example, a phase interpolator circuit 100 implemented at least in part using capacitors may be desirable because it may be less noisy than a phase interpolator circuit 100 implemented using resistors. For example, capacitors may be less noisy than resistors due at least in part to their construction.

In the example of FIG. 3, one or more optional output circuits 144 may be connected to the output signal node 142. The output circuit 144 may receive the signal on the output signal node 142 as an input and generate an adjusted output 146. The one or more optional output circuits 144 may be configured similarly to the one or more optional output circuits 144 of FIG. 2, or may differ in one or more ways.

Figure 4:
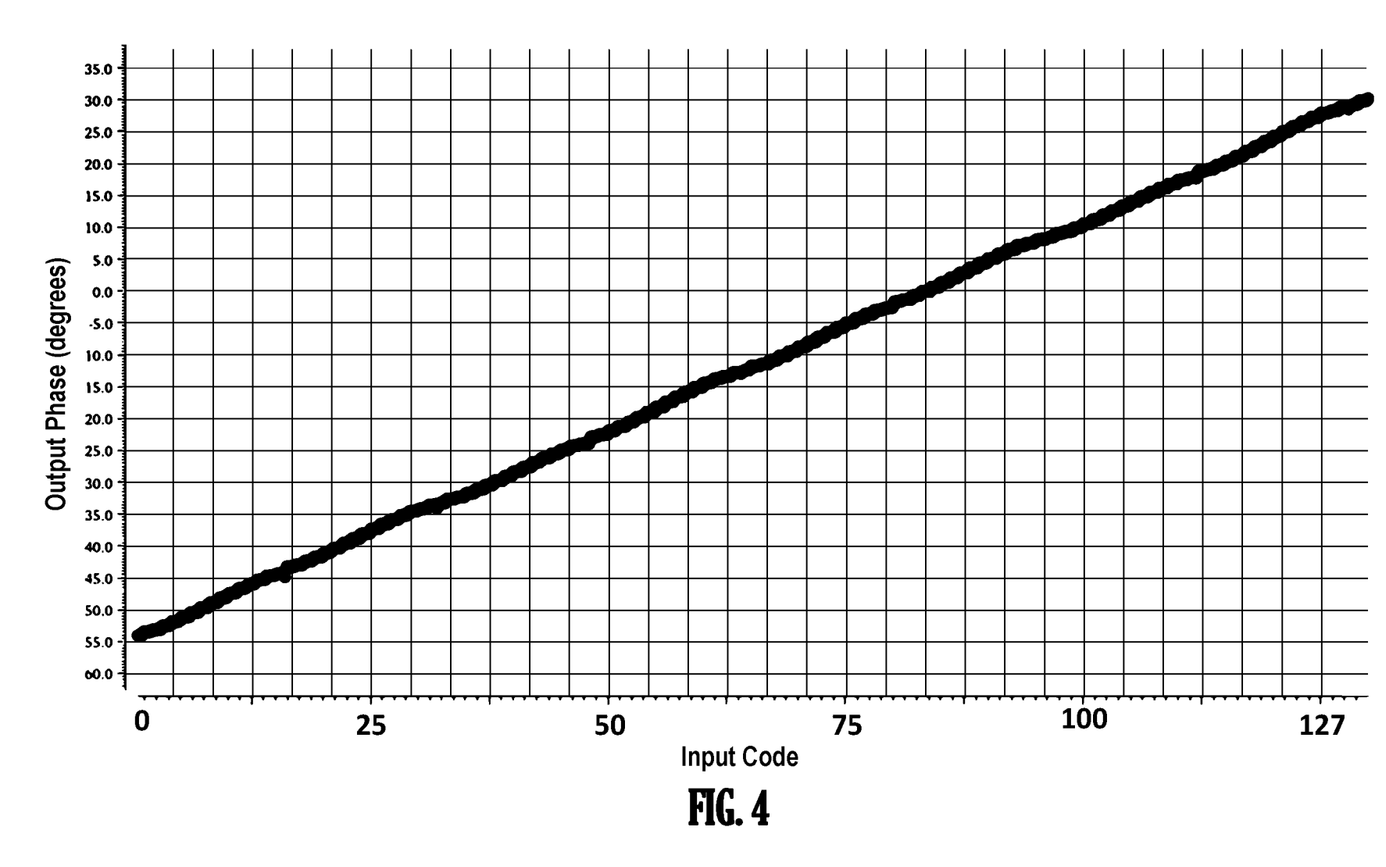
FIG. 4 is a simulated plot showing an example of operating portions of the phase interpolator circuit.

FIG. 4 is a simulated plot showing an example of operating portions of the phase interpolator circuit 100 of FIG. 2. The output phase of the circuit is shown on the x-axis in degrees, and the input code is shown on the y-axis. FIG. 4 shows that the input to output relationship is generally linear from −55 degrees to 30 degrees, for a total range of approximately 85 degrees. In the example of FIG. 4, the phase interpolator circuit 100 receives a 7 bit control signal and produces 128 levels.

Figure 5:
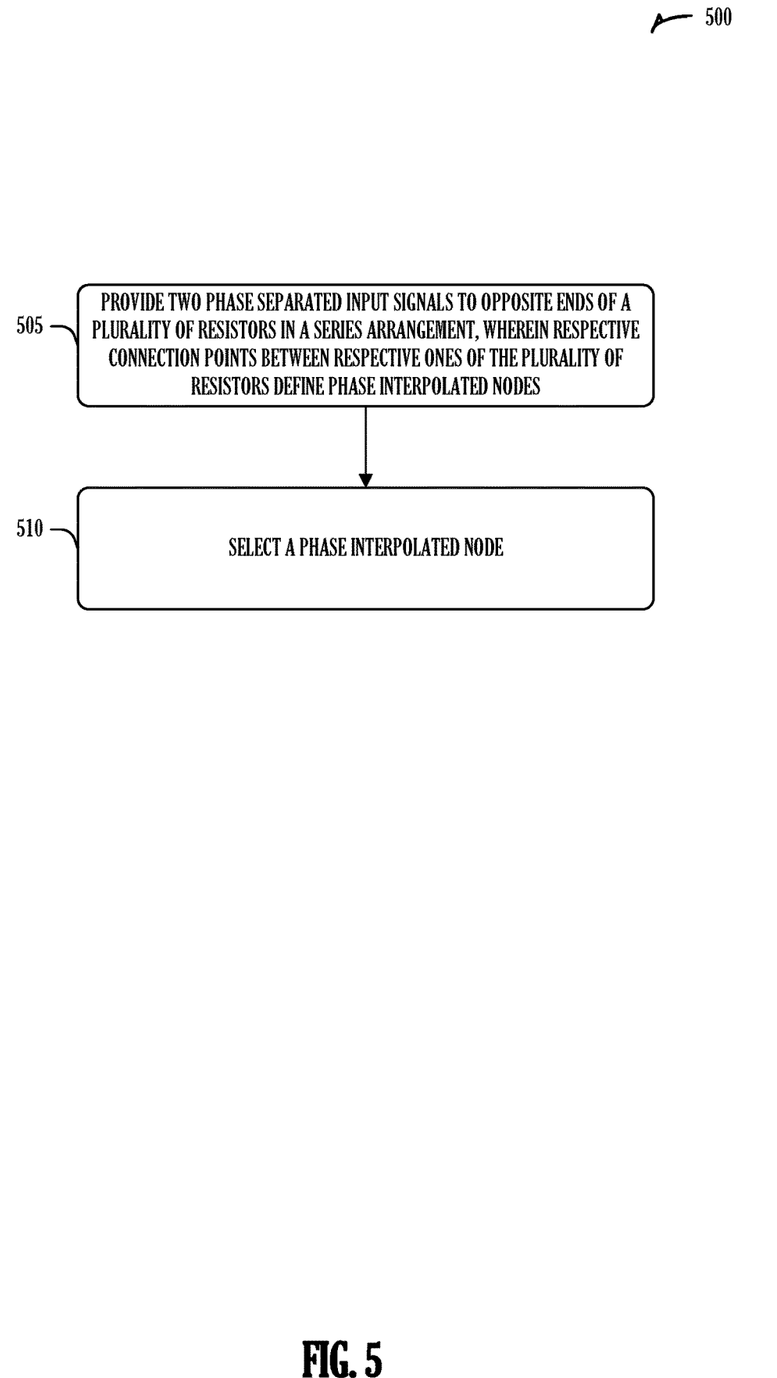
FIG. 5 is a diagram showing an example of a method for operating portions of a phase interpolator circuit.

FIG. 5 is a diagram showing an example of a method 500 for operating portions of a phase interpolator circuit 100. At 505 two phase separated input signals may be provided to opposite ends of a plurality of resistors in a series arrangement, wherein respective connection points between respective ones of the plurality of resistors define phase interpolated nodes. At 510, a phase interpolated node may be selected. The shown order of steps is not intended to be a limitation on the order the steps are performed in. In an example, two or more steps may be performed simultaneously or at least partially concurrently.

At step 505, the resistance values for respective ones of the plurality of resistors may be selected so that respective ones of the phase interpolated nodes generate a specified phase shift. In an example, the resistance values may be selected so that the phase of the phase interpolated nodes are consistent, such as may include being evenly spaced.

At step 510, the phase interpolated node may be selected using selection circuitry 140, such as may include a multiplexor. The method 500 may include one or more additional steps, such as may include using a "coarse" selection to determine the two phase interpolated input signals that are provided to the plurality of resistors and "fine" selection to determine the phase interpolated node that is selected.

Figure 6:
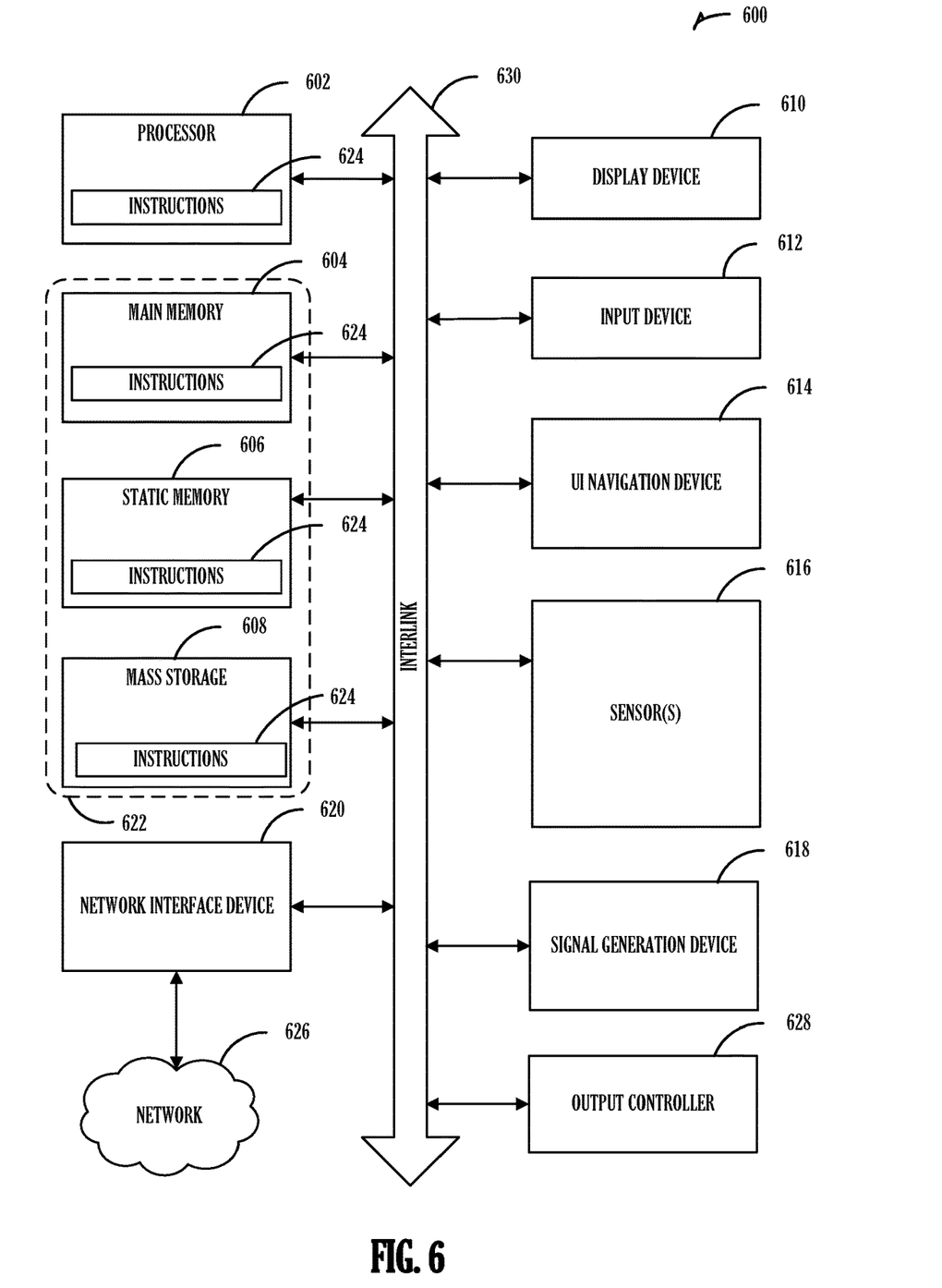
FIG. 6 is a block diagram of an example of portions of a machine upon which one or more portions of the present disclosure may be implemented.

FIG. 6 is a block diagram of an example of portions of a machine 600 upon which one or more portions of the present disclosure may be implemented. Examples, as described herein, may include, or may operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 may include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drives, tape drives, flash storage, or other block devices) some or all of which may communicate with each other via an interlink (e.g., bus) 630. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 may be, or include, a machine readable medium 622 on which is stored one or more sets of data structures or instructions 624 (e.g., software) embodying or utilized by any one or more of the techniques or functions described herein. The instructions 624 may also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 may constitute the machine readable media 622. While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 622 may be representative of the instructions 624, such as instructions 624 themselves or a format from which the instructions 624 may be derived. This format from which the instructions 624 may be derived may include source code, encoded instructions (e.g., in compressed or encrypted form), packaged instructions (e.g., split into multiple packages), or the like. The information representative of the instructions 624 in the machine readable medium 622 may be processed by processing circuitry into the instructions to implement any of the operations discussed herein. For example, deriving the instructions 624 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 624.

In an example, the derivation of the instructions 624 may include assembly, compilation, or interpretation of the information (e.g., by the processing circuitry) to create the instructions 624 from some intermediate or preprocessed format provided by the machine readable medium 622. The information, when provided in multiple parts, may be combined, unpacked, and modified to create the instructions 624. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 624 may be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

ADDITIONAL NOTES & EXAMPLES

Example 1 is a phase interpolator for generating a phase interpolated output signal between two phase separated input signals, the two phase separated input signals received at two phase separated input signal nodes, the phase interpolator comprising: a plurality of circuit elements, the plurality of circuit elements including at least one of resistors or capacitors, in a series arrangement between the two phase separated input signal nodes, wherein respective connection points between respective ones of the plurality of circuit elements provide at least one intermediate phase interpolated signal; and selection circuitry, configured to select the phase interpolated output signal from the at least one intermediate phase interpolated signal.

In Example 2, the subject matter of Example 1 optionally includes wherein component values differ between respective ones of a like type of the plurality of circuit elements.

In Example 3, the subject matter of Example 2 optionally includes wherein the component values of the respective ones of the plurality of circuit elements provide an equal phase spacing between adjacent connection points.

In Example 4, the subject matter of any one or more of Examples 1-3 optionally include wherein the selection circuitry includes a multiplexor with inputs connected to the at least one intermediate phase interpolated signal and an output providing the phase interpolated output signal.

In Example 5, the subject matter of Example 4 optionally includes amplifier circuitry configured to amplify at least one of a voltage or current level of the phase interpolated output signal towards at least one of a voltage or current level of the two phase separated input signals.

In Example 6, the subject matter of any one or more of Examples 1-5 optionally include wherein the two phase separated input signals are sinusoidal, and wherein the phase interpolated output signal is sinusoidal.

In Example 7, the subject matter of Example 6 optionally includes buffer circuitry to convert the phase interpolated output signal to a clock signal with at least one of a defined rising edge or a defined falling edge.

In Example 8, the subject matter of any one or more of Examples 1-7 optionally include wherein the plurality of circuit elements includes at least eight resistors connected in series.

In Example 9, the subject matter of any one or more of Examples 1-8 optionally include wherein the plurality of circuit elements includes at least eight capacitors connected in series.

Example 10 is a system for generating a phase shifted output signal from at least three input signals, the system comprising: signal selection circuitry, configured to select a first intermediate signal and a second intermediate signal from the at least three input signals, wherein the first intermediate signal is phase shifted from the second intermediate signal; a plurality of resistors, in a series arrangement between a first intermediate signal node carrying the first intermediate signal and a second intermediate signal node carrying the second intermediate signal; wherein respective connection points between respective ones of the plurality of resistors form output nodes; and multiplexor circuitry, configured to select the phase shifted output signal from a specified one of the output nodes.

In Example 11, the subject matter of Example 10 optionally includes wherein the at least three input signals are spaced across a specified phase range.

In Example 12, the subject matter of Example 11 optionally includes wherein the system includes four intermediate signals, wherein respective ones of the four intermediate signals are phase shifted by ninety degrees.

In Example 13, the subject matter of any one or more of Examples 10-12 optionally include a multi-bit control signal, wherein a specified number of most significant bits comprise a "coarse" selection and are configured to control the signal selection circuitry to select the first intermediate signal and the second intermediate signal, and a remaining number of least significant bits comprise a "fine" selection and are configured to control the multiplexor circuitry to select the specified one of the output nodes.

In Example 14, the subject matter of any one or more of Examples 10-13 optionally include wherein the multiplexor circuitry includes respective inputs connected to respective output nodes and an output connected to a phase shifted output signal node that carries the phase shifted output.

In Example 15, the subject matter of any one or more of Examples 10-14 optionally include wherein the multiplexor circuitry is configured to allow the selection of the first intermediate signal or the second intermediate signal as the phase shifted output signal.

In Example 16, the subject matter of any one or more of Examples 10-15 optionally include second multiplexor circuitry configured to select a second phase shifted output signal from a second specified output node.

In Example 17, the subject matter of any one or more of Examples 10-16 optionally include gigahertz inclusive.

Example 18 is a method of interpolating a phase between two phase separated input signals, the method comprising: providing the two phase separated input signals to opposite ends of a plurality of resistors in a series arrangement, wherein respective connection points between respective ones of the plurality of resistors define phase interpolated nodes; and selecting a phase interpolated node.

In Example 19, the subject matter of Example 18 optionally includes selecting resistance values for the respective ones of the plurality of resistors so that the respective ones of the phase interpolated nodes generate a specified phase shift.

In Example 20, the subject matter of any one or more of Examples 18-19 optionally include wherein the selecting resistance values includes selecting resistance values so that a phase shift between respective ones of the phase interpolated nodes is consistent.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Such instructions can be read and executed by one or more processors to enable performance of operations comprising a method, for example. The instructions are in any suitable form, such as but not limited to source code, compiled code, interpreted code, executable code, static code, dynamic code, and the like.

Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for generating a phase shifted output signal from at least three input signals, the system comprising:
signal selection circuitry, configured to receive the at least three input signals and select a first intermediate signal and a second intermediate signal from among the at least three input signals, wherein each of the at least three input signals is phase shifted from the other ones of the at least three input signals;
a plurality of circuit elements, the plurality of circuit elements including at least one of resistors or capacitors, in a series arrangement between a first intermediate signal node carrying the first intermediate signal and a second intermediate signal node carrying the second intermediate signal, wherein respective connection points between respective ones of the plurality of circuit elements form output nodes; and
output selection circuitry, configured to select the phase shifted output signal from a specified one of the output nodes.

2. The system of claim 1, wherein component values differ between respective ones of a like type of the plurality of circuit elements.

3. The system of claim 2, wherein the component values of the respective ones of the plurality of circuit elements provide an equal phase spacing between adjacent connection points.

4. The system of claim 1, wherein the output selection circuitry includes a multiplexor with inputs connected to respective output nodes and an output providing the phase shifted output signal.

5. The system of claim 4, further comprising amplifier circuitry configured to amplify at least one of a voltage or current level of the phase shifted output signal towards at least one of a voltage or current level of at least one of the first intermediate signal and the second intermediate signal.

6. The system of claim 1, wherein the signal selection circuitry is configured to receive the three input signals as sinusoidal, and wherein the output selection circuitry is configured to output the phase shifted output signal as sinusoidal.

7. The system of claim 6, further comprising buffer circuitry to convert the phase shifted output signal to a clock signal with at least one of a defined rising edge or a defined falling edge.

8. The system of claim 1, wherein the plurality of circuit elements includes at least eight resistors connected in series.

9. The system of claim 1, wherein the plurality of circuit elements includes at least eight capacitors connected in series.

10. The system of claim 1, wherein the signal selection circuitry is configured to receive the at least three input signals as spaced across a range of at least 180 degrees.

11. The system of claim 10, wherein the signal selection circuitry is configured to receive four input signals, wherein respective ones of the four input signals are phase shifted by ninety degrees.

12. The system of claim 1, further comprising:
a multi-bit control signal input, configured to receive a multi-bit control signal, wherein a specified number of most significant bits comprise a "coarse" selection and are configured to control the signal selection circuitry to select the first intermediate signal and the second intermediate signal, and a remaining number of least significant bits comprise a "fine" selection and are configured to control the output selection circuitry to select the specified one of the output nodes.

13. The system of claim 1, wherein the output selection circuitry includes respective inputs connected to respective output nodes and an output connected to a phase shifted output signal node that carries the phase shifted output signal.

14. The system of claim 1, wherein the output selection circuitry is configured to allow the selection of the first intermediate signal or the second intermediate signal as the phase shifted output signal.

15. The system of claim 1, comprising second output selection circuitry configured to select a second phase shifted output signal from a second specified output node.

16. The system of claim 1, wherein the system operates at a frequency that is between 12 gigahertz and 16 gigahertz inclusive.

17. A method of generating a phase shifted output signal from at least three input signals, the method comprising:
selecting a first intermediate signal and a second intermediate signal from among the at least three input signals, wherein each of the at least three input signals is phase shifted from the other ones of the at least three input signals;
providing the first intermediate signal and the second intermediate signal to opposite ends of a plurality of resistors in a series arrangement, wherein respective connection points between respective ones of the plurality of resistors define phase interpolated nodes; and
selecting a phase interpolated node to provide the phase shifted output signal.

18. The method of claim 17, further comprising:
selecting resistance values for the respective ones of the plurality of resistors so that the respective ones of the phase interpolated nodes generate a specified phase shift.

19. The method of claim 17, wherein selecting resistance values includes selecting resistance values so that a phase shift between respective ones of the phase interpolated nodes is consistent.

* * * * *